US008656482B1

(12) United States Patent
Tosa et al.

(10) Patent No.: US 8,656,482 B1
(45) Date of Patent: Feb. 18, 2014

(54) SECURE COMMUNICATION USING A TRUSTED VIRTUAL MACHINE

(75) Inventors: Raul V. Tosa, Cluj-Napoca (RO); Sandor Lukacs, Floresti (RO); Dan H. Lutas, Cluj-Napoca (RO)

(73) Assignee: Bitdefender IPR Management Ltd., Nicosia (CY)

( * ) Notice: Subject to any disclaimer, the term of this patent is extended or adjusted under 35 U.S.C. 154(b) by 0 days.

(21) Appl. No.: 13/590,119

(22) Filed: Aug. 20, 2012

(51) Int. Cl.
*H04L 12/22* (2006.01)
*H04L 12/12* (2006.01)

(52) U.S. Cl.
USPC .............................................. 726/15; 713/153

(58) Field of Classification Search
None
See application file for complete search history.

(56) References Cited

U.S. PATENT DOCUMENTS

| | | | |
|---|---|---|---|
| 7,565,522 B2 | 7/2009 | Daruwala |
| 7,694,328 B2 | 4/2010 | Asgeirsson |
| 7,836,303 B2 | 11/2010 | Cox |
| 7,949,677 B2 | 5/2011 | Croft |
| 7,975,034 B1 | 7/2011 | Chandra |
| 8,010,679 B2 | 8/2011 | Bissett |
| 8,024,790 B2 | 9/2011 | Chen |
| 8,051,180 B2 | 11/2011 | Low |
| 2009/0089860 A1 | 4/2009 | Forrester |
| 2010/0088757 A1 | 4/2010 | Gautron |
| 2011/0141124 A1 | 6/2011 | Halls |
| 2011/0145821 A1 | 6/2011 | Guyader |
| 2011/0289555 A1 | 11/2011 | DeKoenigsberg |

OTHER PUBLICATIONS

HIMA: A Hypervisor-Based Integrity Measurement Agent. Azab et al. ACM(2009).*
Justifying Integrity Using a Virtual Machine Verifier. Schiffman et al. ACM(2009).*
Amazon, "Overview of Security Processes", Amazon Web Services whitepaper, p. 1-24, Amazon.com, INC, Seattle, WA; May 2011.
Rutkowska et al., "Qubes OS Architecture", Invisible Things Lab whitepaper, version 0.3: p. 1-44, Invisible Things Lab, Warsaw Poland; Jan. 2010.
Haldar et al., "Semantic Remote Attestation—A Virtual Machine directed approach to Trusted Computing", Proceedings of the Third Virtual Machine Research and Technology Symposium, p. 1-10, USENIX Association, San Jose, CA; May 2004.
Garfinkel et al., "Terra: A Virtual Machine-Based Platform for Trusted Computing", Proceedings of the nineteenth ACM symposium on Operating systems principles (SOSP-19), p. 193-206, Bolton Landing, New York, USA; Oct. 2003.

* cited by examiner

*Primary Examiner* — Venkat Perungavoor
(74) *Attorney, Agent, or Firm* — Law Office of Andrei D Popovici, PC

(57) ABSTRACT

A client system, such as a computer or a smartphone, securely exchanges sensitive information with a remote service provider computer system such as a bank or an online retailer. The client system executes a commercially available operating system in an untrusted virtual machine (VM), which may be affected by malware. A hypervisor is configured to launch a trusted, malware-free VM from an authenticated image stored on computer-readable media used by the untrusted VM. The trusted VM executes a thin operating system with minimal functionality, to manage a secure communication channel with the remote server system, wherein sensitive communication is encrypted. Data from the trusted VM is forwarded via the hypervisor to a network interface driver of the untrusted VM for transmission to the remote service provider. The service provider may perform a remote attestation of the client system to determine whether it operates a trusted VM.

7 Claims, 6 Drawing Sheets

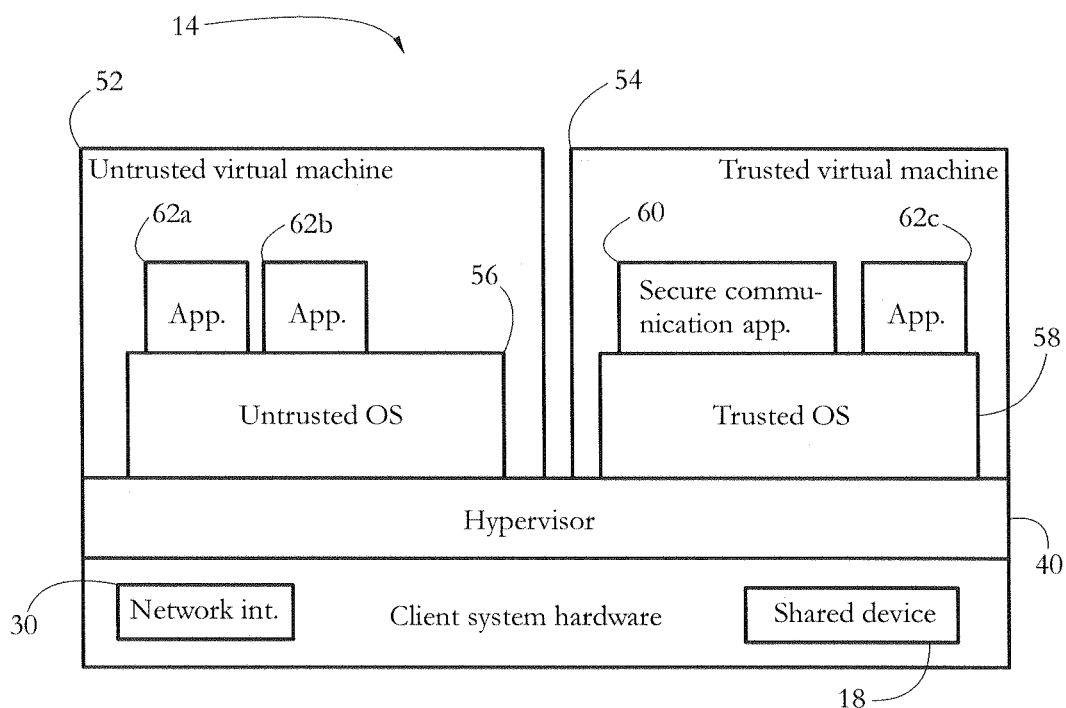
FIG. 3
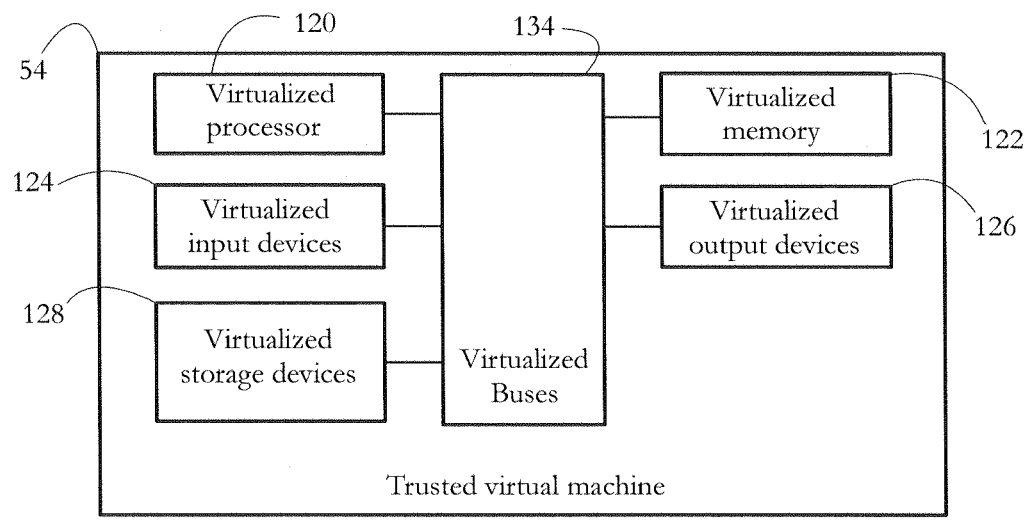
FIG. 4-A

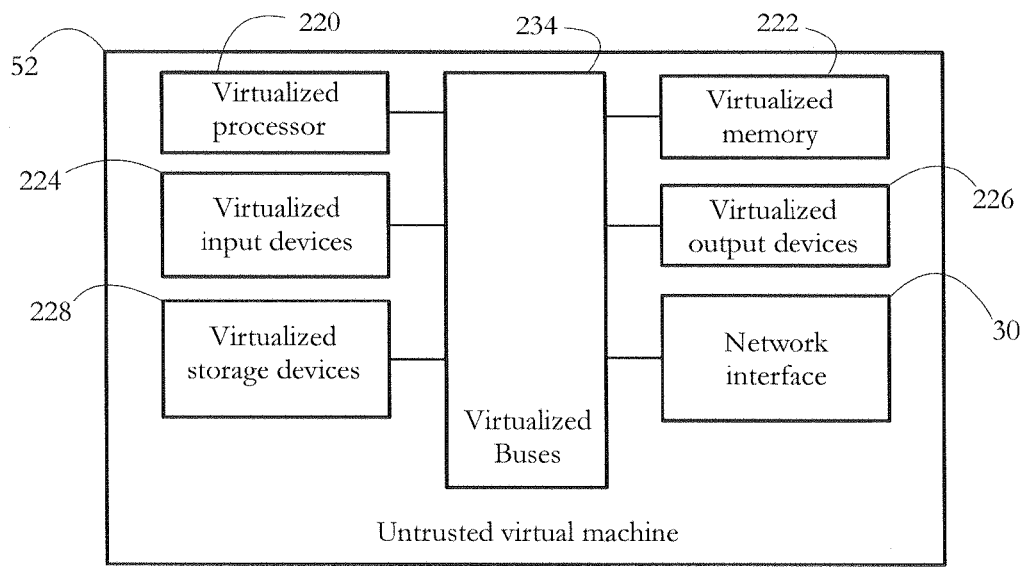
FIG. 4-B
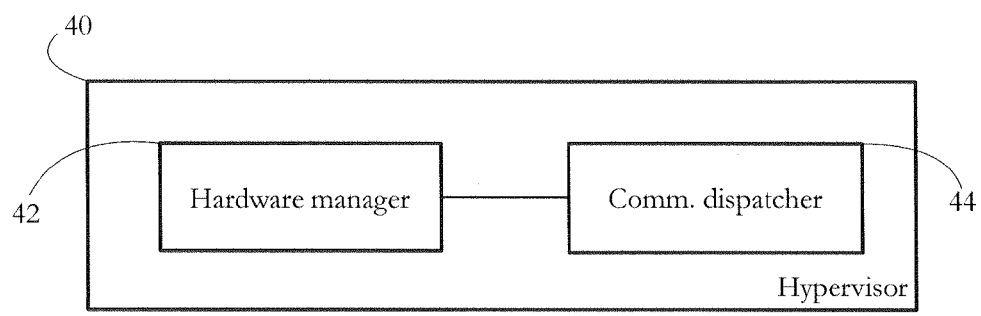
FIG. 5

SECURE COMMUNICATION USING A TRUSTED VIRTUAL MACHINE

BACKGROUND

The invention relates to systems and methods for securing electronic communication between a client and a remote service provider, and in particular systems and methods using hardware virtualization technology.

An increasing number of goods and services are currently provided online, through electronic communication networks such as the Internet. In some such applications, users may remotely access a protected resource such as a bank account through an e-banking platform hosted on a server computer system. To access the protected resource, users are typically required to provide some credentials, such as a password and/or an access code. In e-commerce applications, users may transmit sensitive information such as credit card details and/or other personal information to a remote computer system. Such sensitive data is typically input by the user into an electronic device such as a computer, mobile phone, etc. Subsequently, the sensitive information circulates over a communication network between the user's electronic device and the remote computer system.

Malicious software, also known as malware, affects a great number of computer systems worldwide. In its many forms such as computer viruses, worms, and rootkits, malware presents a serious risk to millions of computer users, making them vulnerable to loss of data and sensitive information, identity theft, and loss of productivity, among others. Malware may attempt to steal private or sensitive information, e.g., by intercepting keyboard inputs corresponding to a user's password or credit card number, or by intercepting communication between the malware-infected computer system and a remote computer system.

Hardware virtualization technology allows the creation of simulated computer environments commonly known as virtual machines (VM), which behave in many ways as physical computer systems. Several virtual machines may run simultaneously on the same hardware platform (physical machine), sharing the hardware resources among them, thus allowing potentially a great number of users to share a computer system. A virtual machine may run its own operating system and/or software applications separately from other virtual machines, thus increasing data security and privacy.

There is considerable interest in developing electronic communication devices allowing users to securely exchange data with remote computer systems, especially when said devices operate on hardware virtualization platforms.

SUMMARY

According to one aspect, a client computer system comprises at least a processor configured to operate an untrusted virtual machine and a hypervisor. The untrusted virtual machine includes a set of drivers for controlling a first set of hardware devices of the client computer system, the first set of hardware devices comprising a network interface, the set of drivers including a network interface driver for the network interface. The hypervisor is configured to control a second set of hardware devices of the client computer system, the second set comprising a shared device selected from a group consisting of an output device and an input device. The hypervisor is further configured, in response to the untrusted virtual machine receiving a user request to connect to a remote server system, to launch a trusted virtual machine distinct from the untrusted virtual machine, wherein launching the trusted virtual machine comprises: employing the hypervisor to determine the authenticity of an image of the trusted virtual machine, and when the image of the trusted virtual machine is authentic, employing the hypervisor to load the image into a memory of the client computer system. The hypervisor is further configured, in response to launching the trusted virtual machine, to receive a data unit from the trusted virtual machine, wherein the data unit is encrypted by the trusted virtual machine; and to send the data unit to the network interface driver of the untrusted virtual machine for transmission to the remote server system through the network interface. The hypervisor is further configured to employ time-division multiplexing to alternate granting exclusive use of the shared device to the trusted virtual machine with granting exclusive use of the shared device to the untrusted virtual machine.

According to another aspect, a server computer system comprises at least a processor configured to receive a data unit from a client computer system, wherein the client computer system is configured to operate an untrusted virtual machine and a hypervisor. The untrusted virtual machine includes a set of drivers for controlling a first set of hardware devices of the client computer system, the first set of hardware devices comprising a network interface, the set of drivers including a network interface driver for the network interface. The hypervisor is configured to control a second set of hardware devices of the client computer system, the second set comprising a shared device selected from a group consisting of an output device and an input device. The hypervisor is further configured, in response to the untrusted virtual machine receiving a user request to connect to a remote server system, to launch a trusted virtual machine distinct from the untrusted virtual machine, wherein launching the trusted virtual machine comprises: employing the hypervisor to determine the authenticity of an image of the trusted virtual machine, and when the image of the trusted virtual machine is authentic, employing the hypervisor to load the image into a memory of the client computer system. The hypervisor is further configured, in response to launching the trusted virtual machine, to receive a data unit from the trusted virtual machine, wherein the data unit is encrypted by the trusted virtual machine; and to send the data unit to the network interface driver of the untrusted virtual machine for transmission to the remote server system through the network interface. The hypervisor is further configured to employ time-division multiplexing to alternate granting exclusive use of the shared device to the trusted virtual machine with granting exclusive use of the shared device to the untrusted virtual machine.

According to another aspect, a client computer system comprises at least a processor configured to operate a hypervisor, the hypervisor further configured to: in response to a user request to connect to a remote server system, launch a trusted virtual machine on the client computer system, the trusted virtual machine loaded from a computer-readable medium used by an untrusted virtual machine executing on the client computer system; in response to launching the trusted virtual machine, receive a data unit from the trusted virtual machine; and send the data unit to a network interface driver of the untrusted virtual machine for transmission to the remote server system.

According to another aspect, a server computer system comprises at least a processor configured to receive a data unit from a client computer system, wherein the client computer system is configured to operate a hypervisor. The hypervisor is further configured to: in response to a user request to connect to the server computer system, launch a trusted virtual machine on the client computer system, the trusted virtual machine loaded from a computer-readable medium used by an untrusted virtual machine executing on the client computer system; in response to launching the trusted virtual machine, receive the data unit from the trusted virtual machine; and send the data unit to a network interface driver of the untrusted virtual machine for transmission to the server computer system.

According to another aspect, a method comprises employing a hypervisor executing on a client computer system, the client computer system including at least a processor, to launch a trusted virtual machine on the client computer system in response to a user request to connect to a server computer system. The trusted virtual machine is loaded from a computer-readable medium used by an untrusted virtual machine executing on the client computer system. The hypervisor is further configured to receive a data unit from the trusted virtual machine in response to launching the trusted virtual machine; and to send the data unit to a network interface driver of the untrusted virtual machine, for transmission to the server computer system.

According to another aspect, a method comprises employing a server computer system comprising at least a processor to receive a data unit from a client computer system, wherein the client computer system is configured to operate a hypervisor. The hypervisor is configured to launch a trusted virtual machine on the client computer system in response to a user request to connect to the server computer system, the trusted virtual machine loaded from a computer-readable medium used by an untrusted virtual machine executing on the client computer system. The hypervisor is further configured to receive the data unit from the trusted virtual machine in response to launching the trusted virtual machine; and to send the data unit to a network interface driver of the untrusted virtual machine for transmission to the server computer system. The method further comprises employing the server computer system to perform an attestation of the trusted virtual machine according to the data unit; and when the attestation is successful, employing the server computer system to grant the client computer system access to a protected resource of the server computer system.

According to another aspect, a non-transitory computer-readable medium stores instructions which, when executed, cause a client computer system comprising at least a processor to form a hypervisor. The hypervisor is configured to launch a trusted virtual machine on the client computer system in response to a user request to connect to a remote server computer system, the trusted virtual machine loaded from a computer-readable medium used by an untrusted virtual machine executing on the client computer system. The hypervisor is further configured to receive a data unit from the trusted virtual machine in response to launching the trusted virtual machine; and to send the data unit to a network interface driver of the untrusted virtual machine for transmission to the remote server computer system.

BRIEF DESCRIPTION OF THE DRAWINGS

The foregoing aspects and advantages of the present invention will become better understood upon reading the following detailed description and upon reference to the drawings where:

FIG. 3 shows an exemplary hypervisor exposing a trusted and an untrusted virtual machine, according to some embodiments of the present invention.

FIG. 4-A illustrates an exemplary configuration of a trusted virtual machine, comprising a plurality of virtualized hardware devices, according to some embodiments of the present invention.

FIG. 4-B illustrates an exemplary configuration of an untrusted virtual machine, according to some embodiments of the present invention.

FIG. 5 illustrates exemplary components of a hypervisor executing on a client system according to some embodiments of the present invention.

DETAILED DESCRIPTION OF PREFERRED EMBODIMENTS

In the following description, it is understood that all recited connections between structures can be direct operative connections or indirect operative connections through intermediary structures. A set of elements includes one or more elements. Any recitation of an element is understood to refer to at least one element. A plurality of elements includes at least two elements. Unless otherwise required, any described method steps need not be necessarily performed in a particular illustrated order. A first element (e.g. data) derived from a second element encompasses a first element equal to the second element, as well as a first element generated by processing the second element and optionally other data. Making a determination or decision according to a parameter encompasses making the determination or decision according to the parameter and optionally according to other data. Unless otherwise specified, an indicator of some quantity/data may be the quantity/data itself, or an indicator different from the quantity/data itself. Unless otherwise specified, a hash is an output of a hash function. Unless otherwise specified, a hash function is a mathematical transformation mapping a sequence of symbols (e.g. characters, bits) into a number or bit string. Computer readable media encompass non-transitory media such as magnetic, optic, and semiconductor storage media (e.g. hard drives, optical disks, flash memory, DRAM), as well as communications links such as conductive cables and fiber optic links. According to some embodiments, the present invention provides, inter alia, computer systems comprising hardware (e.g. one or more processors) programmed to perform the methods described herein, as well as computer-readable media encoding instructions to perform the methods described herein.

The following description illustrates embodiments of the invention by way of example and not necessarily by way of limitation.

Figure 1:
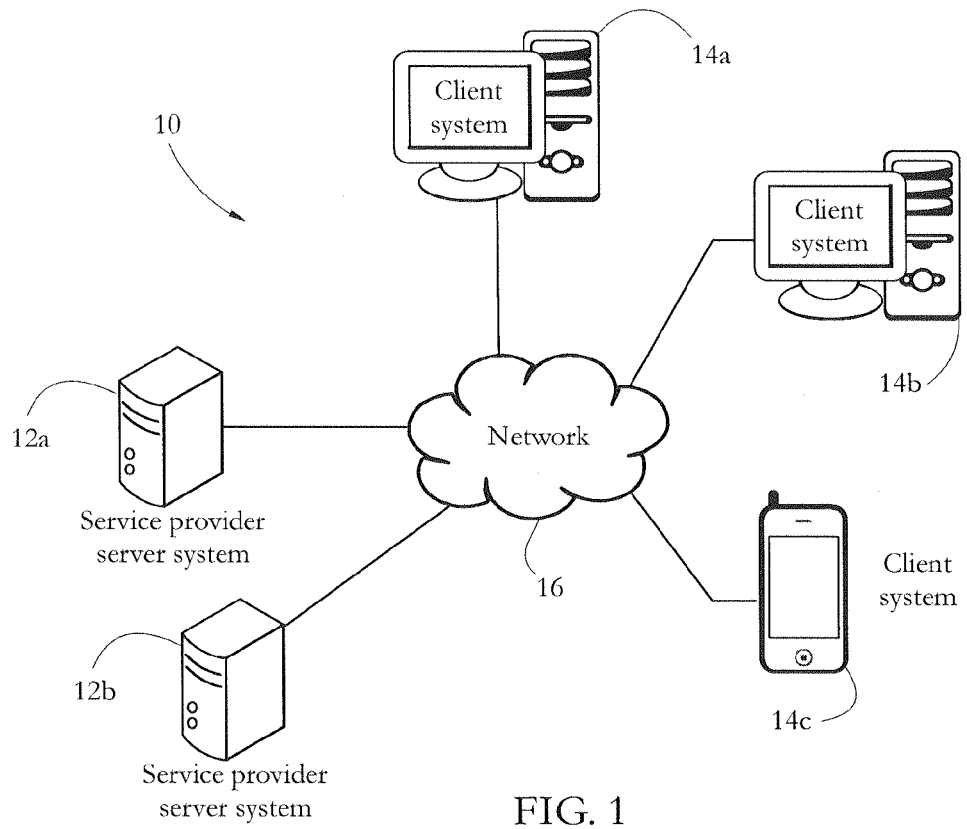
FIG. 1 shows an exemplary secure communication system according to some embodiments of the present invention.

FIG. 1 shows an exemplary secure communication system 10 according to some embodiments of the present invention. System 10 comprises a set of service provider server systems 12*a-b* and a set of client systems 14*a-c*. In some embodiments, server systems 12*a-b* may provide services such online banking and e-commerce, among others. For instance, an illustrative server provider server system 12a-b may host a webpage allowing users to remotely access bank accounts via a web interface. Another example of server system 12a-b hosts an online store offering goods and/or services to online clients. Other illustrative service providers may host computer entertainment (gaming) and/or social media sites.

Client systems 14a-c may represent end-user devices such as computers and mobile telephones, among others, each having a processor, memory, and storage. In some embodiments, client systems 14a-c may represent individual customers/clients, or several client systems 14a-c may belong to the same customer. A network 16 connects client systems 14a-c and service provider server systems 12a-b. Network 16 may be a wide-area network such as the Internet, and may include a local area network (LAN). Data exchanges between client systems 14a-c and server systems 12a-b may take place over network 16, as shown below.

Figure 2:
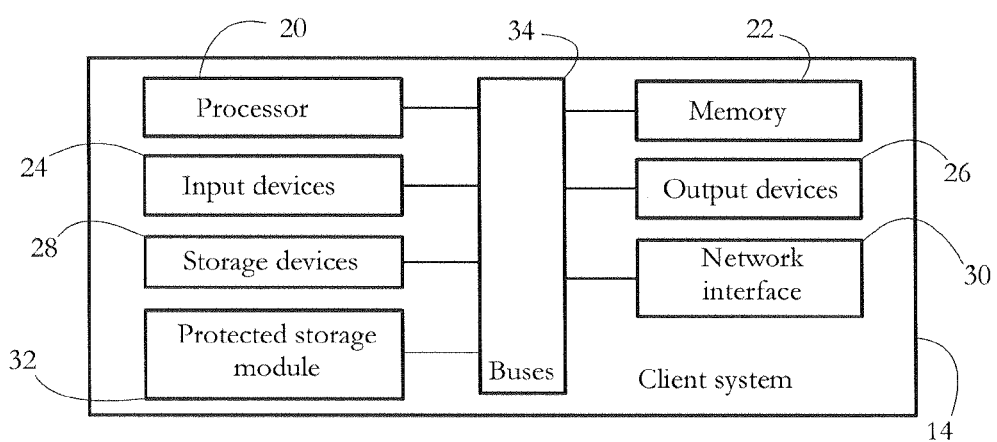
FIG. 2 illustrates an exemplary hardware configuration of a client computer system, according to some embodiments of the present invention.

FIG. 2 shows an exemplary hardware configuration of a client system 14, according to some embodiments of the present invention. System 14 represents a computer system for illustrative purposes; other client devices such as mobile telephones may have a different configuration. In some embodiments, system 14 comprises a processor 20, a memory unit 22, a set of input devices 24, a set of output devices 26, a set of storage devices 28, and a network interface controller 30, all connected by a set of buses 34.

In some embodiments, processor 20 comprises a physical device (e.g. multi-core integrated circuit) configured to execute computational and/or logical operations with a set of signals and/or data. In some embodiments, such logical operations are delivered to processor 20 in the form of a sequence of processor instructions (e.g. machine code or other type of software). Memory unit 22 may comprise volatile computer-readable media (e.g. RAM) storing data/signals accessed or generated by processor 20 in the course of carrying out instructions. Input devices 24 may include computer keyboards, mice, and microphones, among others, including the respective hardware interfaces and/or adapters allowing a user to introduce data and/or instructions into system 14. Output devices 26 may include display devices such as monitors and speakers among others, as well as hardware interfaces/adapters such as graphic cards, allowing system 14 to communicate data to a user. In some embodiments, input devices 24 and output devices 26 may share a common piece of hardware, as in the case of touch-screen devices. Storage devices 28 include computer-readable media enabling the non-volatile storage, reading, and writing of software instructions and/or data. Exemplary storage devices 28 include magnetic and optical disks and flash memory devices, as well as removable media such as CD and/or DVD disks and drives. Network interface controller 30 enables system 14 to connect to network 16 and/or to other devices/computer systems. Typical controllers 30 include network adapters. Buses 34 collectively represent the plurality of system, peripheral, and chipset buses, and/or all other circuitry enabling the intercommunication of devices 20-32 of client system 14. For example, buses 34 may comprise the northbridge connecting processor 20 to memory 22, and/or the southbridge connecting processor 20 to devices 24-30, among others.

Client system 14 (FIG. 2) may also include a protected storage module 32. In some embodiments, module 32 is a hardware device, e.g. an integrated circuit, configured to securely store sensitive information. Protected storage module 32 may comprise a persistent memory configured so that software executing on the respective client system 14 may not overwrite a content of the respective module. Some modules 32 are configured to store a cryptographic key uniquely associated with the respective module and/or client system 14 in the persistent memory (an exemplary such key is known as an endorsement key in some embodiments). Storage module 32 may comprise a writable memory, configured so that selected software objects executing on the respective machine are allowed to overwrite data stored in the writable memory. For instance, module 32 may be configured so that only software components of a hypervisor and/or other software executing at root privilege level may have write permission to a memory of module 32 (see more details below). In some embodiments, protected storage module 32 also comprises a cryptographic processor configured to generate cryptographic keys, to compute hashes, and/or to perform encryption/decryption of data. Exemplary protected storage modules 32 include trusted platform module (TPM) chips produced by various hardware manufacturers.

FIG. 3 shows an illustrative software configuration of client system 14, according to some embodiments of the present invention. In some embodiments, a hypervisor 40 executes on the client system hardware. Hypervisor 40, also known in the art as a virtual machine monitor, comprises software allowing the multiplexing (sharing) by multiple virtual machines of hardware resources of client system 14, such as processor operations, memory, storage, input/output, and networking devices. In some embodiments, hypervisor 40 enables multiple virtual machines (VM) and/or operating systems (OS) to run concurrently on client system 14, with various degrees of isolation. Virtual machines are commonly known in the art as software emulations of actual physical machines/computer systems, each capable of running its own operating system and software independently of other VMs. Examples of popular hypervisors include the VMware ESX™ from VMware Inc. and the open-source Xen hypervisor, among others.

Client system 14 further comprises an untrusted VM 52 and a trusted VM 54, operating concurrently and exposed by hypervisor 40. While FIG. 3 shows just two VMs for simplicity, client system 14 may include larger numbers (e.g. tens or hundreds) of VMs 52, 54. The number of VMs may change during the operation of client system 14.

In some embodiments, untrusted VM 52 may execute an untrusted operating system 56 and/or a set of software applications 62a-b concurrently and independently of other VMs running on client system 14. OS 56 comprises software that provides an interface to the (virtualized) hardware of untrusted VM 52, and acts as a host for computing applications 62a-b running on the respective OS. Untrusted OS 56 may comprise any commercially available operating system such as Windows®, MacOS®, Linux®, iOS®, or Android™, among others. Applications 62a-b may include word processing, image processing, database, browser, and electronic communication applications, among others.

In some embodiments, trusted VM 54 is launched by hypervisor 40 from an authenticated image stored on a computer-readable medium used by untrusted VM 52, as shown in detail below. Trusted VM 54 may execute a trusted operating system 58 providing a software interface to the (virtualized) hardware of trusted VM 54. In some embodiments, trusted OS 58 comprises OS components enabling transfer of data between trusted VM 54 and untrusted VM 52, as described below. OS 58 acts as a host for a secure communication application 60 and possibly other applications 62c. In some embodiments, secure communication application 60 manages secure exchanges of data between client system 14 and service provider server systems 12a-b, for instance allowing a user to remotely access a bank account. Secure communication application 60 may comprise a graphical user interface configured to display sensitive information to the user, and to receive sensitive data such as passwords, login credentials, and/or credit card information from the user.

In some embodiments, software forming part of hypervisor 40 creates a plurality of virtualized (software-emulated) devices, each virtualized device emulating a physical device 20-34, and assigns a set of virtual devices to each VM operating on client system 14. Thus, each VM 52, 54 operates as if it possesses its own at of physical devices, i.e., as a more or less complete computer system. In some embodiments, only a subset of hardware devices 20-34 is virtualized. Some hardware devices of client system 14 may be shared between virtual machines 52 and 54. FIG. 3 shows such a shared device 18, which may be, for example, an output device or an input device. In some embodiments, other devices such as network interface 30 are used exclusively by untrusted VM 52. Some shared devices 18 may operate in a time-multiplexed configuration, wherein exclusive use of the respective device may switch back and forth between VMs 52 and 54.

FIGS. 4-A-B illustrate exemplary configurations of trusted VM 54 and untrusted VM 52, respectively, according to some embodiments of the present invention. VM 54 comprises a virtualized processor 120, a virtualized memory unit 122, virtualized input 124, output 126, and storage devices 128, all connected by virtualized buses 134. Untrusted VM 52 comprises a virtualized processor 220, a virtualized memory unit 222, virtualized input 224, output 226, and storage devices 228, connected by virtualized buses 234.

In some embodiments, virtualized input devices 124, 224 interface with physical input devices 24 of client system 14 in a time-multiplexed manner, so that at any given time, only one of trusted VM 54 and untrusted VM 52 may use devices 24, such as a keyboard. Similarly, virtualized output devices 126 and 226 may be configured to share the use of output devices 26 (for instance, a graphic adapter) in a time-multiplexed manner. In some embodiments, at any given time, only one of trusted VM 54 and untrusted VM 52 may use output devices 26. Time-multiplexing control of input and output devices may prevent software executing in untrusted VM 52 from intercepting data from trusted VM 54. For instance a password typed into application 60 (see FIG. 3), or sensitive information displayed on a screen by application 60 may not be intercepted by software executing within untrusted VM 52 since VMs 52 and 54 do not have simultaneous access to use the devices 24 and/or 26.

FIG. 5 shows an exemplary diagram of hypervisor 40 according to some embodiments of the present invention. Hypervisor 40 comprises a hardware manager 42 and a communication dispatcher 44 connected to the hardware manager. In some embodiments, hardware manager 42 is configured to determine which physical hardware devices (e.g., network interface 30, etc.) are allocated to either trusted VM 54 or untrusted VM 52, and which devices need to be virtualized (e.g., processor 20, memory 22, etc.). In some embodiments, hardware manager 42 may identify a physical device according to the Peripheral Component Interconnect (PCI) device class of the respective device (e.g., 0x02 for network interfaces), and/or according to a PCI vendor and device IDs (e.g., 0x8086 for "Intel, Inc", 0x1076 for "Intel PRO/1000 MT Server Adapter").

Hardware manager 42 may be further configured to control and manage configuration parameters of certain devices of client system 14 during operation of VMs 52 and 54. Such parameters include, for each device of client system 14, input/output ports, memory mapped input/output (MMIO) zones, the PCI configuration space, interrupt requests (IRQ), and message-signaled interrupts (MSI), among others. For instance, hardware manager 42 may intercept attempts made by untrusted OS 58 and/or trusted OS 56 to modify certain device parameters, e.g., to allocate a new MMIO zone for a certain PCI device, and configure the respective virtualized device accordingly.

In some embodiments, communication dispatcher 44 (FIG. 5) is configured to manage the two-way transfer of data between trusted VM 54 and network interface 30 of client system 14. Communication dispatcher 44 may oversee transfer of data from VMs 52, 54 to hypervisor 40 and from hypervisor 40 to VMs 52 and 54. The operation of dispatcher 44 will be described in detail below.

Hypervisor 40 may form a part of an anti-malware package comprising several software modules. In some embodiments, anti-malware software is installed on a client system already running a commercial OS such as Windows® or iOS®. Hypervisor 40 takes control of processor 20 at root privilege level (e.g., VMXroot on Intel platforms), and displaces other processes, including the OS, to non-root privilege level, thus creating a hardware virtualization platform such as the one depicted in FIG. 3. Following installation of hypervisor 40, the initial operating system of client system 14 becomes untrusted OS 56, executing within the virtual environment of untrusted VM 52. Hardware manager 42 sets up and manages virtualized hardware devices (e.g., FIG. 4-B) so untrusted VM 52 may operate as if it were running directly on the physical hardware of system 14.

Initialization of hypervisor 40 may include several other operations, such as storing a file comprising an image of trusted VM 54 on computer-readable media such as a hard disk used by untrusted VM 52, a solid-state memory unit, or a network location accessible to VM 52. In some embodiments, the image of trusted VM 54 comprises a set of data representing a machine state of trusted VM 54, including processor state and control register values, among others. Loading the image file onto memory 22 effectively creates an instance of trusted VM 54 within client system 14. Hypervisor 40 may further compute a hash of the image of trusted VM 54, and store a copy of the hash in a protected location of system 14, such as protected storage module 32. Computing the hash may comprise applying a hash function to the image, or to a part of the image; exemplary hash functions include checksum, cyclic redundancy check (e.g., CRC32), and various cryptographic hash functions such as message-digest algorithms (e.g., MD5) and secure hash algorithms (e.g., SHA256). In some embodiments, hypervisor 40 may take control of protected storage module 32 to prevent software operating at non-root privilege level to modify contents of its memory.

In some embodiments, upon initialization of hypervisor 40, a set of other software modules may be installed onto system 14 and configured to execute within untrusted VM 52, for instance an online banking application and/or a browser component. Such software may provide an interface to hypervisor 40 from within untrusted VM 52.

Figure 6:
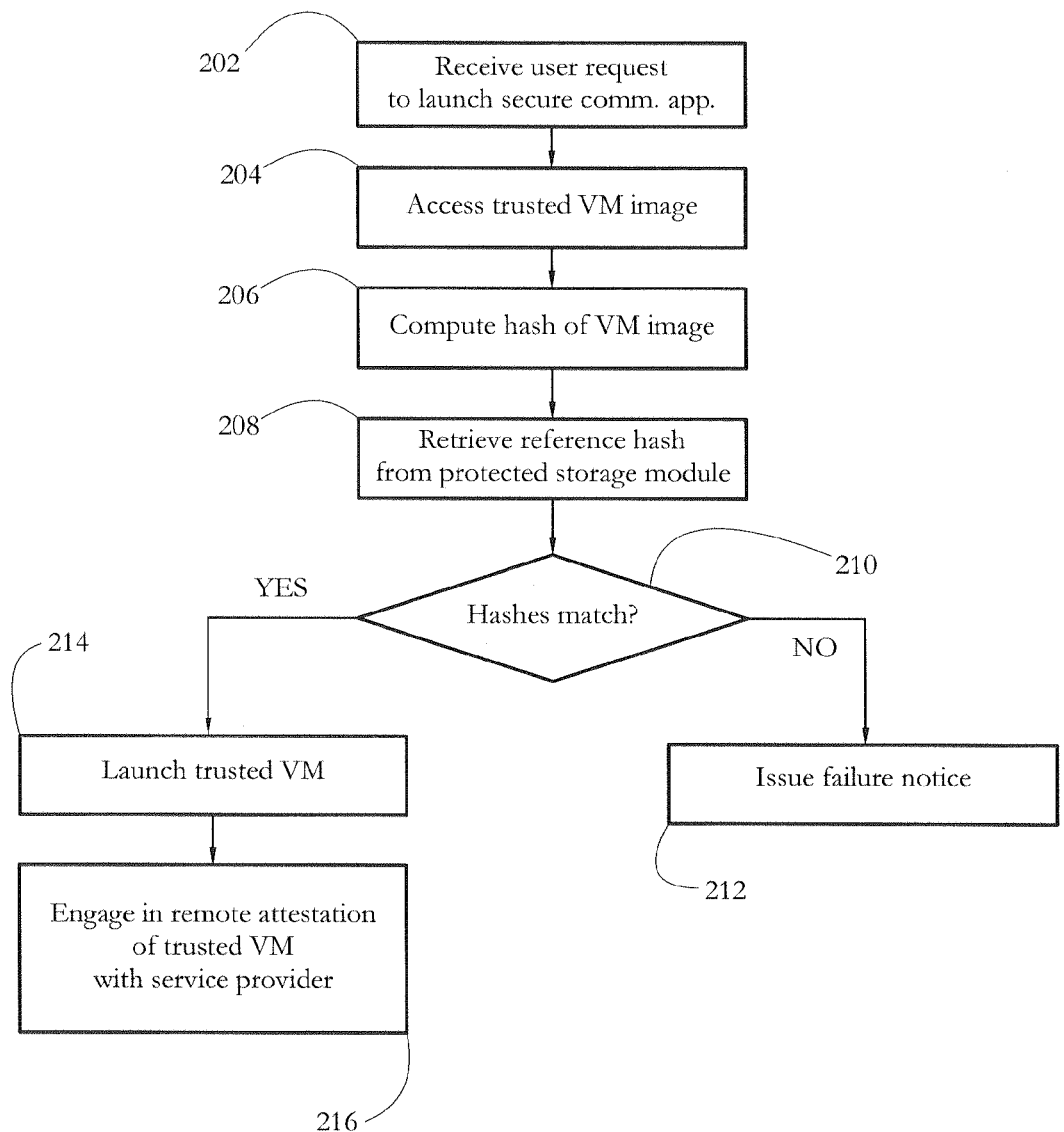
FIG. 6 illustrates an exemplary sequence of steps executed by the hypervisor of FIG. 3 when launching a trusted virtual machine according to some embodiments of the present invention.

FIG. 6 shows an exemplary sequence of steps performed by hypervisor 40 when launching trusted VM 54, according to some embodiments of the present invention. In some embodiments, VM 54 is launched when untrusted VM 52 is already running. In a typical application, a user may indicate an intention to access a protected resource managed by service provider server systems 12*a-b*, e.g., to access a bank account or to execute an online payment. To access the protected resource, the user may e.g. launch an application installed on untrusted VM 52, such as an online banking application (see above). Alternatively, the user may press a predetermined combination of keys on a keyboard used by untrusted VM 52 and controlled by hypervisor 40. In some embodiments, such action on the part of the user may be interpreted by hypervisor 40 as a request to launch secure communication application 60 on trusted VM 54. In a step 202, hypervisor 40 receives the request. In some embodiments, receiving the request to launch application 60 comprises intercepting a processor instruction executing in VM 52. Several such techniques exist in the field of virtualization. For instance, when receiving a request to access the protected resource, a banking application or browser component may trigger a VM exit processor event. In some embodiments, VM exit processor events comprise transferring control of the processor from non-root privilege operations (e.g., untrusted VM 52) to root-level operations such as hypervisor 40. Exemplary VM exit processor events include the VMExit event on Intel platforms. Hypervisor 40 may therefore intercept such an event and interpret it e.g., according to certain parameters of the respective event, as a request to launch application 60. Alternatively, the respective application/browser component may employ specific processor instructions, which invoke processor functionality at the level of hypervisor 40 (root-level). Exemplary such instructions include VMCall and VMFunc on Intel platforms.

In some embodiments, step 202 may also comprise determining whether an instance of trusted VM 54 is already running. If not, in a step 204, hypervisor 40 accesses the image file of the trusted VM, stored on computer-readable media used by untrusted VM 52 (in some embodiments, the image file is stored upon installation of hypervisor 40, as shown above). In a sequence of steps 206-210, hypervisor 40 determines the authenticity of the image file. A hash of the respective image file is computed, and compared to the reference hash stored in protected storage module 32. When the hashes do not match, indicating that an alteration of the image file has taken place, in a step 212 hypervisor 40 may issue a failure notice and/or display a notification to the user. When the two hashes match, indicating that the image file accessed in step 204 is authentic, i.e., identical to the original image file stored by hypervisor 40 upon initialization, in a step 214 hypervisor 40 launches trusted VM 54 by e.g. loading the image file into memory, to be executed by processor 20. In some embodiments, hypervisor 40 may then launch secure communication application 60 and engage in remote attestation of trusted VM 54 with service provider systems 12a-b, as described below. Launching application 60 may also activate a graphical user interface allowing a user to read and input sensitive information, such as bank account details, passwords, login credentials, and credit card information, among others.

Figure 7:
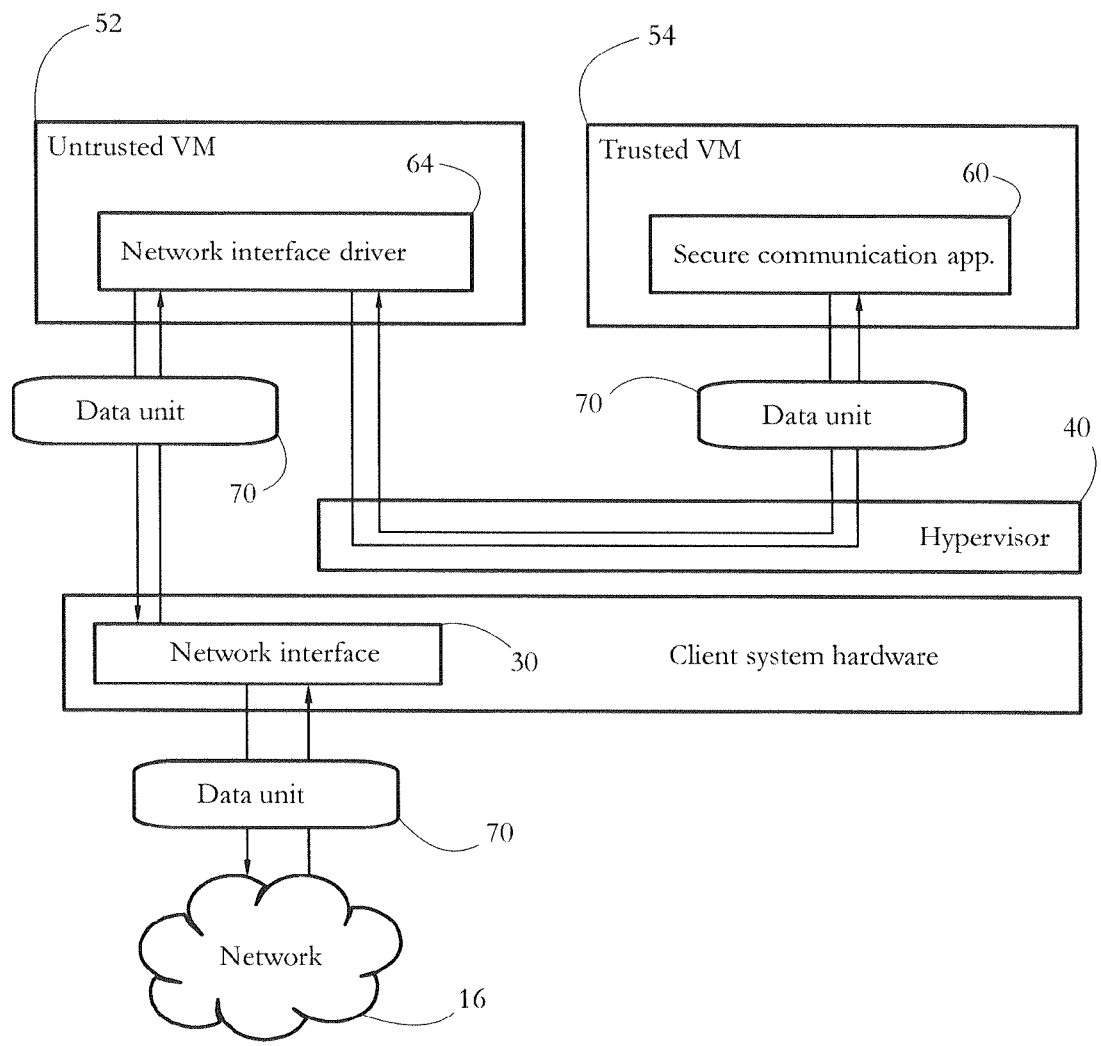
FIG. 7 shows an exemplary transmission of a data unit between the trusted virtual machine and a network, according to some embodiments of the present invention.

Secure communication comprises two-way data exchanges between client system 14 and server systems 12a-b over network 16. Such communication may be encrypted using any of the cryptographic techniques know in the art. In typical digital communication protocols, data circulating between two endpoints is segmented into data units, such as data packets. Each data unit may comprise a header and a payload, the header including information such as network routing addresses, and the payload comprising a fragment of the data itself. The bit size and/or formatting of data units may be protocol-specific. FIG. 7 shows an exemplary transmission of a data unit between trusted virtual machine 54 and network 16, according to some embodiments of the present invention. When operating in send mode, a data unit 70 is sent from secure communication application 60 to hypervisor 40. Communication dispatcher 44 of hypervisor 40 then forwards unit 70 to untrusted VM 52. VM 52 then employs a network interface driver 64, which may be a component of untrusted OS 56, to send data unit 70 to network interface 30 controlled by VM 52. Network interface 30 then transmits unit 70 over network 16.

To send data unit 70 from trusted VM 54 to hypervisor 40, some embodiments of the present invention employ interception by hypervisor 40 of VM exit processor events, as described above. For instance, trusted VM 54 may include a software driver configured to use a virtual network interface emulated by hypervisor 40. One exemplary driver that may be used by VM 54 is the Network Driver Interface Specification (NDIS) Virtual Miniport Driver from the Microsoft Windows Driver Kit. Such drivers may be modified to include instructions (such as VMCall and/or VMFunc on Intel platforms) which call on hypervisor 40 to receive data unit 70 from trusted VM 54. In some embodiments, data unit 70 is transferred from VM 54 to hypervisor 40 through memory pages shared by VM 54 and hypervisor 40.

To transfer data unit 70 from hypervisor 40 to untrusted VM 52, some embodiments of the present invention use an interrupt injection mechanism to notify network interface driver 64 of VM 52, e.g. through a dedicated software module, that data is available for sending over network 16. Several such interrupt injection techniques are known in the art of virtualization; they represent a subclass of vectored-event injection mechanisms, which inject processor events into a virtual machine when transferring control of the processor from a hypervisor to a virtual machine controlled by said hypervisor (in the present example, from hypervisor 40 onto untrusted VM 52).

When operating in receive mode, untrusted VM 52 receives data unit 70 from network 16 via hardware interface 30, then makes data unit 70 available to hypervisor 40, using e.g. the VMCall/VMFunc mechanism described above. Next, communication dispatcher 44 of hypervisor 40 forwards unit 70 to the minimal network driver of VM 54 and/or further to application 60, using e.g., an interrupt injection mechanism as described above. In some embodiments, data exchange may proceed via memory pages shared by hypervisor 40 and virtual machines 52, 54.

Figure 8:
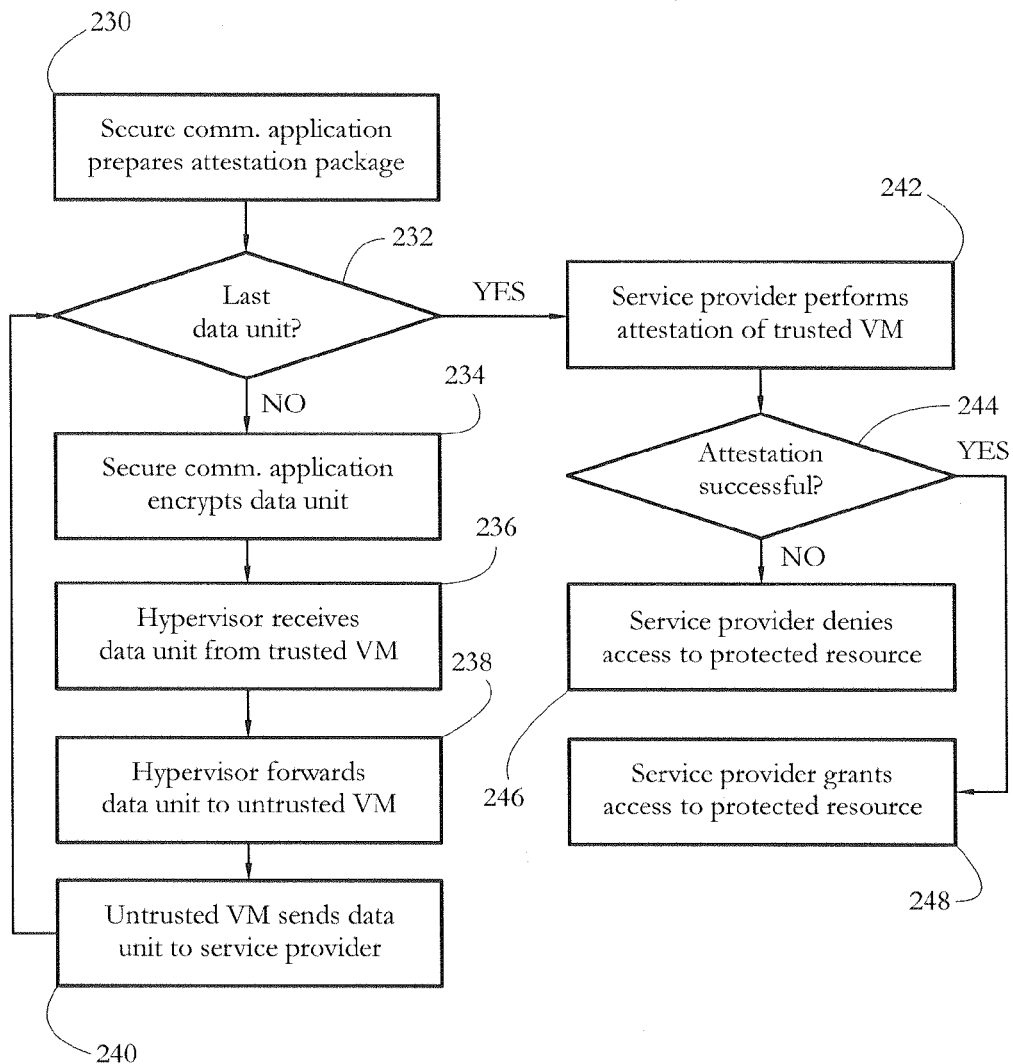
FIG. 8 shows an exemplary sequence of steps executed by the secure communication system of FIG. 1 to perform a remote attestation of a client system, according to some embodiments of the present invention.

FIG. 8 shows an exemplary sequence of steps executed by secure communication system 10 (FIG. 1) to perform a remote attestation of client system 14, according to some embodiments of the present invention. In some embodiments, remote attestation comprises a set of operations performed by a first entity (e.g. service provider server systems 12a-b) to determine whether a second entity distinct from the first (e.g., the client system 14) operates in a trustworthy state. For instance, attestation may determine whether client system 14 operates certified versions of certain software components such as the operating system. Malware infecting client system 14 may effect changes to the operating system and/or other software components, possibly compromising data safety and privacy of users. Such changes to the integrity of software components may be detected by service provider systems 12a-b through the remote attestation process.

In a step 230, secure communication application 60 assembles an attestation package for transmission to service provider system 12a-b. In some embodiments, the attestation package comprises a copy of the hash of the image of trusted VM 54 stored by hypervisor 40 in protected storage module 32, and any other data that might identify the legitimacy of OS components and software applications executing on trusted VM 54 (e.g., a hash of a module dynamically loaded into the trusted VM). The attestation package may also include identification data for a user of trusted VM 54, such as login credentials or a password or a hash of a password, among others. In some embodiments, the attestation package is cryptographically signed with a unique secure key, such as the endorsement key of module 32 or a key provided by the respective service provider (e.g., bank). Alternatively, the attestation package may be signed using a key provided by a third party such as a certification authority. Such signing methods are well known in the art.

Step 230 may further comprise dividing the attestation package into data units for transmission over network 16. A sequence of steps 232-240 is executed in a loop until all data units 70 of the attestation package have been sent to service provider server system 12*a-b*. In a step 232, application 60 verifies whether the last data unit 70 of the attestation package has been sent. If not, in a step 234 application 60 encrypts and/or cryptographically signs data unit 70. Next, in a step 236, application 60 forwards data unit 70 from trusted VM 54 to hypervisor 40, using e.g. the VMCall/VMFunc mechanism described above, in relation to FIG. 7. In a step 238, communication dispatcher 44 of hypervisor 40 forwards data unit 70 to untrusted VM 52, using e.g., an event injection mechanism as described above. In a step 240, network interface driver 64 of untrusted VM 52 employs network interface 30 to send data unit 70 to service provider system 12*a-b*.

When the last data unit 70 has been transmitted, in a step 242 service provider system 12*a-b* performs an attestation of client system 14/trusted VM 54. Several attestation methods are known in the art. In one example, attestation comprises comparing a hash received from client system 14 to a reference hash maintained by service provider server systems 12*a-b*. For instance, if a hash of the image of trusted VM 54 received from client system 14 matches a reference hash, service provider system 12*a-b* may determine that trusted VM 54 executing on client 14 is in a trustworthy state (e.g., unaffected by malware), and therefore attestation of client 14 is successful. To perform attestation of client systems 14, some embodiments of server systems 12*a-b* maintain a database of trusted hashes, such as hashes of trusted VM images in various configurations. Such hashes may be updated every time the trusted VM image is updated. In some embodiments, server systems also maintain a database of user information such as passwords or hashes of passwords, among others.

In a step 244, service provider system 12*a-b* determines whether the attestation of client system 14 is successful. If yes, in a step 248, server system 12 grants access to client system 14 to a protected resource (e.g., bank account information). When attestation of client system 14 is not successful, e.g. when the hash received from client system 14 does not match the reference hash maintained by service provider system 12*a-b*, indicating that client system 14 is possibly infected with malware, in a step 246 service provider server system 12 denies access to client system 14 to the protected resource.

Following successful attestation of client system 14, two-way exchanges of data between client system 14 and service provider server systems 12*a-b* may proceed according to the mechanism described above, in relation to FIG. 7.

The exemplary systems and methods described above allow secure communication of sensitive information between a client system such as a personal computer or a telecommunication device, and a service provider such as a bank or an online retailer.

In conventional communication systems, malware can compromise the safety and privacy of data exchange. Such systems may employ malware scanners to try to ensure that a client system does not comprise malware, before attempting to exchange sensitive information with a remote party. Typical malware scanners place a significant burden on the computational resources of a client system, and may reduce overall productivity and increase the cost of operation of the client system. Additionally, the effectiveness of malware scanners may depend essentially on the ability to maintain up-to-date databases of malware-identifying features and/or behaviors, to cope with the ever-changing nature of malware threats. By contrast, some embodiments of the present invention do not require a malware scanner for operation. Instead, the software module performing the actual communication operates in a secure environtnent within an authenticated, trusted virtual machine.

By displacing secure communication modules to a dedicated virtual machine isolated from other software executing on the client system, security of data exchanges with the server provider is substantially increased. In some embodiments of the present invention, data traffic between the client system and the service provider is encrypted by software components of the trusted VM. Even though such data circulates via the untrusted VM on the way to and from the network, and can thus be intercepted by malware operating within the untrusted VM, encryption prevents such malware from accessing the data.

In conventional systems, malware may operate at the same processor privilege level as other software, including communication modules, and may therefore interfere in the operation of such software. By contrast, in some embodiments of the present invention, a trusted hypervisor operates at root privilege, while all other software executing on the respective client system is removed to lesser privilege levels. The hypervisor launches the trusted virtual machine carrying out all secure communication with the remote server. In some embodiments, the trusted virtual machine launch comprises an integrity check of the virtual machine. The trusted virtual machine is launched only when an image of the trusted virtual machine is found to be identical to a reference, malware-free image previously stored by the hypervisor.

In some conventional systems, malware may compromise the security of communication, for instance by intercepting keyboard inputs such as passwords and credit card details. In some embodiments of the present invention, hardware input and/or output devices are shared by untrusted (possibly malware infected) and trusted (malware-free) virtual machines in a time-multiplexed configuration, i.e., each virtual machine has exclusive use of the devices for a predetermined time interval. Therefore, as a user types a password or receives sensitive information on a screen controlled by the trusted virtual environment, malware executing in the untrusted environment may not intercept such data, by virtue of not having simultaneous access to said devices.

Instead of operating a fully functional operating system with software support for all hardware devices of the client system, in some embodiments of the present invention, the trusted virtual machine operates a thin OS endowed with minimal functionality, placing only a minimal burden on the computational resources of the client system. Such configurations may substantially improve the performance, scalability and portability of anti-malware systems. For instance, instead of configuring and operating its own virtualized network interface, the trusted virtual machine may indirectly use the network interface already configured and used by the untrusted virtual machine. In some embodiments, data traffic to and/or from the trusted virtual machine is routed by the hypervisor through the untrusted virtual machine, thus taking advantage of the software capabilities of the untrusted VM.

Some embodiments of the present invention execute a remote attestation of the client system by a service provider system, for instance by comparing a hash received from the client system to a reference hash stored by the service provider. A hash match may indicate that the client system operates a trusted virtual machine; consequently the service provider may grant the client system access to a protected resource such as a bank account. When the hashes do not match, indicating that the client system may be tampered with by malware, the service provider may determine not to grant access to the protected resource.

It will be clear to one skilled in the art that the above embodiments may be altered in many ways without departing from the scope of the invention. Accordingly, the scope of the invention should be determined by the following claims and their legal equivalents.

What is claimed is:

1. A client computer system comprising at least a processor configured to operate:

an untrusted virtual machine including a set of drivers for controlling a first set of hardware devices of the client computer system, the first set of hardware devices comprising a network interface, the set of drivers including a network interface driver for the network interface; and a hypervisor configured to control a second set of hardware devices of the client computer system, the second set comprising a shared device selected from a group consisting of an output device and an input device, wherein the hypervisor is further configured to:

in response to the untrusted virtual machine receiving a user request to connect to a remote server system, launch a trusted virtual machine distinct from the untrusted virtual machine, wherein launching the trusted virtual machine comprises:

employing the hypervisor to determine the authenticity of an image of the trusted virtual machine; and when the image of the trusted virtual machine is authentic, employing the hypervisor to load the image into a memory of the client computer system;

in response to launching the trusted virtual machine, receive a data unit from the trusted virtual machine, wherein the data unit is encrypted by the trusted virtual machine; and send the data unit to the network interface driver of the untrusted virtual machine for transmission to the remote server system through the network interface;

and wherein the hypervisor is further configured to employ time-division multiplexing to alternate granting exclusive use of the shared device to the trusted virtual machine with granting exclusive use of the shared device to the untrusted virtual machine.

2. The client computer system of claim 1, wherein the image of the trusted virtual machine is stored on computer-readable media used by the untrusted virtual machine.

3. The client computer system of claim 1, wherein determining the authenticity of the image of the trusted virtual machine comprises:

calculating a hash of the image of the trusted virtual machine; and when the hash matches a reference hash stored in a protected storage module of the client computer system, determining that the image is authentic, wherein the untrusted virtual machine does not have permission to modify a content of the protected storage module.

4. A server computer system comprising at least a processor and configured to receive a data unit from a client computer system, wherein the client computer system is configured to operate:

an untrusted virtual machine including a set of drivers for controlling a first set of hardware devices of the client computer system, the first set of hardware devices comprising a network interface, the set of drivers including a network interface driver for the network interface; and a hypervisor configured to control a second set of hardware devices of the client computer system, the second set comprising a shared device selected from a group consisting of an input device and an output device, wherein the hypervisor is further configured to:

in response to the untrusted virtual machine receiving a user request to connect to a remote server system, launch a trusted virtual machine distinct from the untrusted virtual machine, wherein launching the trusted virtual machine comprises:

employing the hypervisor to determine the authenticity of an image of the trusted virtual machine; and when the image of the trusted virtual machine is authentic, employing the hypervisor to load the image into a memory of the client computer system;

in response to launching the trusted virtual machine, receive a data unit from the trusted virtual machine, wherein the data unit is encrypted by the trusted virtual machine; and send the data unit to the network interface driver of the untrusted virtual machine for transmission to the server computer system through the network interface;

and wherein the hypervisor is further configured to employ time-division multiplexing to alternate granting exclusive use of the shared device to the trusted virtual machine with granting exclusive use of the shared device to the untrusted virtual machine.

5. The server computer system of claim 4, wherein the image of the trusted virtual machine is stored on computer-readable media used by the untrusted virtual machine.

6. The server computer system of claim 4, wherein performing the integrity check comprises:

calculating a hash of the image of the trusted virtual machine; and when the hash matches a reference hash stored in a protected storage module of the client computer system, determining that the image is authentic, wherein the untrusted virtual machine does not have permission to modify a content of the protected storage module.

7. The server computer system of claim 4, further configured to:

perform an attestation of the trusted virtual machine according to the data unit; and when the attestation is successful, grant the client computer system access to a protected resource of the server computer system.

* * * * *